United States Patent [19]

Prochazka

[11] 3,852,099

[45] Dec. 3, 1974

[54] DENSE SILICON CARBIDE CERAMIC AND METHOD OF MAKING SAME

[75] Inventor: Svante Prochazka, Ballston Lake, N.Y.

[73] Assignee: General Electric Company, Schenectady, N.Y.

[22] Filed: Nov. 27, 1972

[21] Appl. No.: 309,676

[52] U.S. Cl. .......... 117/119, 117/119.2, 117/123 B, 106/44
[51] Int. Cl. ..................... C04b 41/24, C22c 29/00
[58] Field of Search ........... 117/123 A, 123 B, 118, 117/119, 119.2, 169 A; 106/44

[56] References Cited
UNITED STATES PATENTS

| | | | |
|---|---|---|---|
| 2,108,794 | 2/1938 | Boyer et al. | 106/44 |
| 2,637,091 | 5/1953 | Nicholson | 106/44 |
| 3,275,722 | 9/1966 | Popper et al. | 106/44 |
| 3,649,342 | 3/1972 | Bartlett | 117/123 A |

Primary Examiner—William D. Martin
Assistant Examiner—John H. Newsome
Attorney, Agent, or Firm—Gerhard K. Adam; Joseph T. Cohen; Jerome C. Squillaro

[57] ABSTRACT

A dense silicon carbide ceramic is disclosed which is composed of a silicon carbide matrix filled with a boron carbide-silicon carbide composition. The silicon carbide ceramic is prepared by performing a porous silicon carbide body, infiltrating the pores of the body with a boron carbide-silicon carbide melt at a sufficient temperature, and directionally cooling the filled body to advance the solidification front through the body whereby a dense substantially nonporous ceramic is formed.

9 Claims, No Drawings

DENSE SILICON CARBIDE CERAMIC AND METHOD OF MAKING SAME

The chemical and physical properties of silicon carbide make it an excellent material for high temperature structural applications. These properties include good oxidation resistance and corrosion behavior, good heat transfer coefficients, low expansion coefficient, high thermal shock resistance and high strengths at elevated temperature. This unique combination of properties suggests the use of silicon carbide as check valves for handling corrosive liquids, linings of ball mills, heat exchangers for high temperature furnaces, pumps for die casting machines, and combustion tubes.

Heretofore, dense silicon carbide bodies were prepared by reaction bonding, chemical vapor deposition and by hot pressing. The reaction bonding procedure involves hydrostatically pressing or extruding a mixture of silicon carbide graphite and a binder into a shaped article such as a rod. The rod is then heated in a crucible containing silicon, which upon melting reacts with the graphite to form more silicon carbide. The silicon carbide formed by the reaction acts to bond the microstructure together. In chemical vapor deposition, methyltrichlorosilane vapor is mixed with hydrogen and passed into a reaction chamber containing a heated graphite rod. The silane decomposes on contact with the hot rod and silicon carbide is deposited. The third method is hot pressing which has been used to produce small specimens under closely controlled conditions.

Unfortunately, silicon carbide is not easily sintered to densities approaching the theoretical density of 3.21 grams per cubic centimeter. A method of hot pressing silicon carbide to uniform densities on the order of 98 percent of the theoretical density with slight addition of aluminum and iron aiding in densification is disclosed by Alliegro et al., J. Ceram. Soc., Vol. 39, No. 11, Nov. 1956, Pages 386–389. They reported that dense hot pressed silicon carbide containing 1 percent by weight of aluminum had a modulus of rupture of 54,000 psi at room temperature and 70,000 psi at 1,371° C.

Quite surprisingly, I have now discovered an improved procedure for making high strength silicon carbide articles by an infiltration procedure. This technique involves initially forming a porous silicon carbide compact and then infiltrating the compact with a lower melting alloy. The product obtained is nonporous and is at approximately the theoretical density.

In accordance with the invention, I have discovered a dense silicon carbide ceramic which is composed of a silicon carbide matrix filled with a boron carbide-silicon carbide composition. The silicon carbide ceramic is prepared by preforming a porous silicon carbide body, infiltrating the pores of the body with a boron carbide-silicon carbide melt at a sufficient temperature, and directionally cooling the filled body to advance the solidification front unidirectionally through the body whereby a dense, substantially nonporous ceramic is formed. The resulting dense, strong, two-phase ceramic is suitable as an engineering material, such as, for example, in high temperature gas turbine applications.

The porous silicon carbide compact or preform may be prepared by pressing a particulate silicon carbide mixture. The grain size of the particles should be such that good packing is obtained. Numerous experiments have shown that the coarsest particle size should correspond to about 270 mesh (Tyler) size to optimize mechanical properties. However, to obtain high green density the particle size distribution is important. A major fraction of a coarse SiC powder is added to certain amounts of a finer SiC powder which fit into the void between the large particles and improve packing. Theoretical discussions of an optimum particle size distribution exist in the literature but are restricted to spheres. Because the geometry of the real particles is irregular, the optimum distribution is found by routine experiment.

The density of the compact is a critical parameter for successful infiltration. For smaller articles or parts with a wall thickness less than one-half inch, a density as low as 70 percent may be used. Larger specimens, having a wall thickness of 1 inch or more require at least 75 percent of the theoretical density. The reason for this requirement is mainly the tendency for internal crack formation on infiltration of low density preforms which arises from shrinkage. While this shrinkage is negligible for compacts with densities 80 percent, it may be as much as 1 percent for 70 percent dense compacts and lead to difficulties. Another important consideration related to the density of the compact is that the porosity of the compact is inversely proportional to the density. Thus, in the final product, the amount of boron carbide which forms a second phase is directly related to the porosity of the preform. Since $B_4C$ is the less refractory and less oxidation resistant phase, it is advantageous to use the highest achievable green density which gives the lowest $B_4C$ content.

I have found that a preferred mixture of silicon carbide consists of about 55 weight percent 150 mesh, 15 weight percent of 600 mesh and 30 weight percent of $-10\mu$, the mesh being defined as Tyler sieve sizes. The silicon carbide is the $\alpha$ type and may be commercial abrasive grades. The silicon carbide particles are compacted at ambient temperatures at pressures as low as 10,000 pounds per square inch. Preferably a sufficient amount of a lubricant, such as about 1 percent by weight of aluminum stearate, together with a binder, such as about 3 percent by weight of a phenolic novolak resin, should be used during the compacting step. The preformed porous silicon carbide body is then placed in a graphite crucible.

As an alternative procedure, a preformed compact may be prepared by slip casting technique. A paraffin model of the shape to be fabricated is embedded in a moldable carbon material made, for instance, from graphite powder and a 30 percent solution of a phenolic novolak resin in alcohol. Conveniently, this is done by dipping the model into a carbon crucible filled with the carbon-resin solution mixture. The solvent is allowed to dry off slowly over a period of several days. Heating causes the melting and evaporation of the paraffin model and the curing of the resin. Finally, pyrolysis of the resin yields carbon which bonds the original graphite powder into a fairly strong porous solid. This prefiring, in the absence of oxygen, has to be done gradually according to a slow heating schedule to avoid crack formation. The procedure is completed at about 700° C. and the time to heat up is a function of the dimension and thickness of the mold.

In this step, essentially a carbon mold is formed having a cavity exactly corresponding to the model. Also repeated dipping of the paraffin model into a fluid graphite powder-resin slurry and drying to build up a crust, as is done in investment casting, may be used to form the graphite molds. After the mold has been prefired, a silicon carbide slurry is slip cast into it. This is the same procedure known as "solid casting" by ceramists with the exception that a carbon die is employed instead of a plaster-of-paris mold. A casting slip may be prepared from various liquids such as water, ethyl alcohol, benzene, carbon tetrachloride, etc., using proper deflocculants. In a preferred embodiment of my invention, carbon tetrachloride is the dispersant and aluminum stearate is the defloculant.

The cavity in the die is filled with the slip. As the dispersant is drained off by the porous graphite, a solid builds up at the die wall until the whole cavity is filled by the casting. This is a well known procedure in ceramic processing. A satisfactory slip typically yields a body having up to 75 percent relative density after drying. In the present procedure the body is not removed from the die but is dried as an integral part with the carbon mold and used for the infiltration procedure.

The alloy used in the infiltration is the eutectic or modified eutectic alloy in the pseudo-binary system, boron carbide ($B_4C$)-silicon carbide (SiC), which melts at about 2,250° C. The high melting point and the compatibility of the alloy with SiC are the major advantages of the infiltration procedure by which the pores in the SiC compact are filled with the liquid alloy by capillary action. A highly refractory body results from this procedure which may be used as a structural material at elevated temperatures up to 1,600° C. in air and up to 2,200° C. in an inert atmosphere.

In preparing the infiltrating alloy, the boron carbide and silicon carbide powders are mixed and dry pressed into pellets which may be used directly for infiltration. The eutectic mixture is composed of about 70 weight percent of boron carbide $B_4C$ and about 30 weight percent silicon carbide. The eutectic mixture may be modified by adding an excess SiC over the actual eutectic ration to provide a melt saturated by SiC at all temperatures occurring in the system. Thus, the preferred range for the infiltrating composition contains about 55–70 weight percent of boron carbide and 30–45 weight percent of silicon carbide. If, for instance, the infiltration is to be carried out at 2,300° C., the phase diagram of the system indicates that the alloy should contain approximately 40 weight percent of SiC. Were the actual eutectic composition used in this case, dissolution of some SiC would take place in the zone of the compact, which is at temperature above 2,250° C., during the infiltration. When a lower $B_4C$/SiC molar ration is used in such a case, the excess silicon carbide remains undissolved in large crystals on top of the infiltrated body after cooling and may be easily removed on finishing. This latter case is, of course, the favorable alternative and an alloy with an excess of SiC is preferred in most instances.

Minor additions, in amounts of up to 10 percent by weight of silicon metal or aluminum carbide, may be used as additions to the infiltrating alloy in order to improve infiltration in some SiC compacts. These additions lower the temperature of liquid formation in the $B_4C$-SiC system and improve the densities of the resulting product. They also affect the microstructures in that they enhance recrystallization of the original SiC grains so that coarser materials result. Carbon, is used as an additive, has an opposite effect in that it suppresses grain growth during infiltration. For instance, 2 percent carbon added to the silicon carbide compact produces a microstructure composed of rounded off uniform grains compared to a highly irregular shape of the grains obtained without a carbon addition.

The infiltrating alloy may be used as a powder compact or premelted alloy. In the latter case, the powder is charged in a carbon crucible and melted in a furnace above 2,250° C. in argon. The premelted alloy has the advantage of accelerated melting during infiltration as compared to powder compacts. This arises from the higher thermal conductivity and becomes appreciable upon forming large specimens.

The silicon carbide compact in contact with the eutectic alloy is heated to a temperature above the melting point of the eutectic alloy in a temperature gradient. The gradient is such that the alloy is exposed to the higher temperature region and the opposite end of the compact experiences the lower temperature region which has to be slightly above 2,250° C., the eutectic melting temperature. A temperature difference of 50° to 100° C. has been used in most of our experiments and the thermal gradient varied between 50° C./cm. to 5° C./cm. The thermal gradient, however, is not essential during infiltration itself providing that it can be generated during the succeeding cooling period. This latter alternative requires more sophisticated equipment such as a cooled graphite pedestal. A stream of argon introduced into a cavity in the pedestal is one of the many possible arrangements to produce a thermal gradient.

The infiltration itself is a very rapid process and is limited only by the time required for full melting of the charge of the eutectic alloy. Depending on the size of the alloy campact, it typically takes from 10 seconds up to about 3 minutes and is best established by direct observation of the assembly through a sighting hole in the furnace.

Immediately after the infiltration is completed, the system is slowly cooled while maintaining the thermal gradient. This causes solidification to start from the side of the body furthest from the molten eutectic. Thus as cooling proceeds, a solidification front of the infiltrating alloy sweeps through the body. A mass flow of the liquid through the body is thus maintained which is necessary to compensate for the volume change of the melt on transition from liquid to solid. In this way, pore formation which would otherwise take place is suppressed.

At the infiltration temperature which lies above 2,250° C., only argon or another inert gas can be used as the furnace atmosphere. Although the argon purity is not critical, its oxygen content should not exceed 1,000 parts per million. At higher oxygen concentrations impaired wetting of SiC by the eutectic alloy is observed which in some cases entirely suppresses infiltration. Because the harmful oxygen concentration can easily be reached in a closed system by desorption of trapped gases, a system with flowing argon is almost a necessity.

When infiltration is performed at atmospheric pressure of argon, frequently much of the gas is trapped in the compact which results in increased porosity. This is almost fully eliminated by carrying out the infiltration under a reduced argon pressure. A pressure of 1 mm. Hg of argon was found quite satisfactory. However, in this case, the total pressure in the system is below the partial pressure of silicon, i.e. the temperature is above the silicon boiling point. Substantial porosity may be formed by the silicon vapor atmosphere in the pores if the infiltrated body is cooled under these conditions. This is avoided by back-filling the furnace chamber with argon up to atmospheric pressure after melting of the eutectic has been completed and carrying out the cooling under this pressure.

My invention is further illustrated by the following examples:

EXAMPLE I

A preformed compact was prepared from a particulate mixture of finely divided silicon carbide having the following Tyler mesh sizes: 144 g. of 150 mesh, 66 g. of 600 mesh, and 40 g. of −10 microns. The mixture was dispersed in a 1% solution of aluminum stearate in carbon tetrachloride to obtain a thick slurry which was then stirred for 3 hours. Some of the solvent was dried off and the resulting slurry was pressed in a steel die into a 1½ inch diameter 3 inches long cylinder at a pressure of 20,000 psi. During pressing the solvent was removed to yield a strong green compact having a density in excess of 80 percent of the theoretical density.

An infiltration mixture was prepared from commercial grade materials by mixing 2 parts by weight of −325 mesh boron carbide with one part by weight of −325 mesh silicon carbide and then pressing the mixture into circular discs 1½ inch in diameter in a steel die.

The pressed silicon carbide compact was placed on a massive graphite block as a setter and then an excess, i.e., about 22 percent weight percent, of the eutectic infiltration mixture was placed on top of the compact. The sample and the graphite block were placed into a graphite tube furnace in such a manner that the graphite block extended beyond the hot zone of the furnace. Thus, the graphite block served as a heat sink and created a temperature gradient to be established in the sample during the heating cycle. The temperature difference was measured through a top sighting window at the face of the setter and the body, and then adjusted at 2,000° C. by moving the carbon block up and down. The furnace was then heated to 2,300° C. in an argon atmosphere of 10 mm. mercury pressure. After holding at this temperature for 5 minutes, the temperature was gradually decreased at a rate of 5° C. per minute until the temperature reached 2,150° C. as read on the top of the sample at which temperature the furnace was shut off and the sample allowed to cool.

The top and bottom face portions of the sample were ground off by a diamond wheel to remove the remainder of the eutectic melt. The resulting product had a density of 3.10 grams per cc. and corresponded to 99 percent of the theoretical density. The product was extremely hard, strong, impervious and abrasion resistant. Diamond cut test bars annealed in argon at 1,800° C. to remove surface damage introduced on machining, had an average modulus of rupture of 40,000 psi at room temperature and 22,000 psi at 1,500° C. in air. The material was exposed to 10 repeated heat-ups with a gas-oxygen torch to 1,300° C. and cooled with a blast of pressurized air without failure. It also resisted repeated quenching from 700° C. into water.

Oxidation at 1,400° C. in air caused a weight loss 0.53 mg./cm.$^2$ after 24 hours which did not change any more at extended exposure. This may be explained by the fact that a thin protective oxide coating had formed on the surface. At 1,600° C. in air the weight loss after 27 hours was 2.83 mg./cm$^2$., was not yet stable but the rate of oxidation was falling off. This data shows that the silicon carbide formed bodies were sufficiently oxidation resistant.

EXAMPLE II

A soft moldable mass was prepared by dispersing a −40 mesh graphite powder in a 40 percent by weight solution of a phenolic resin dissolved in ethanol. A paraffin wax cylinder 1 inch in diameter and 2 inches long was embedded into the moldable graphite mass contained in a paper container and was dried at room temperature for 4 days. The drying was continued at 40° C., just below the melting temperature of the paraffin wax, for another 2 days. Thereafter, the temperature was slowly increased to 60° C. at which the paraffin wax core melted and the wax was drained off. The graphite mold which contained a cavity in the shape of the wax cylinder was heated up slowly to 600° C. in nitrogen to form a porous strong graphite die.

A silicon carbide casting slip was prepared by dispersing 126 grams of 150 mesh silicon carbide, 24 grams of 600 mesh silicon carbide and 30 grams of −10 micron silicon carbide powders by ball milling in 60 cc. of a ½ percent solution of aluminum stearate in carbon tetrachloride. The first two silicon carbide powders were commercial abrasive quality and the latter silicon carbide was prepared by wet ball milling and acid leaching of the 600 mesh silicon carbide.

The slip was poured into the graphite die and the dispersant drained off until the die cavity was filled with a casting. The procedure was the same as that used in ceramic forming called "solid slip casting". Thereafter, the die with the casting was dried at 80° C. to evaporate the solvent and was then placed in a carbon resistor furnace on a solid graphite block. A 20 gram cylindrical compact made from one part by weight of −325 mesh silicon carbide and two parts by weight of −325 mesh boron carbide powders was placed on top of the casting and the furnace was heated to 2,300° C. and subjected to a heating and cooling cycle as set forth and described in Example I. The powder compact melted and the melt infiltrated the casting but did not react with the carbon die.

After infiltration was completed, the sample was removed from the furnace and refired at 800° C. in air until the carbon die burned off. The remainder of the silicon carbide boron carbide infiltrant was ground off from the top of the ceramic sample. The density of the product was 3.05 grams per cc. and the body was impermeable and had a smooth surface appearance.

EXAMPLE III

Following the procedure and using the silicon carbide powder mixture described in Example II, a 4 inches square tile having a thickness of three-eighths inch was pressed, dried and then prefired in argon at 2,000° C. A powder mixture composed of 30 weight percent of −325 mesh silicon carbide, 60 weight percent of −325 mesh boron carbide and 10 weight percent of aluminum carbide was charged into a carbon crucible and heated up in an induction furnace in argon to 2,200° C. The infiltration melt was cooled to room temperature, removed from the crucible and broken up into large pieces.

The fired tile was then set on its edge into a carbon crucible and the rest of its volume was filled with −40 mesh graphite powder. The powder was tapped and leveled with the upper edge of the tile. Several pieces of the premelted alloy amounting to 70 grams were put on top and in contact with the edge of the tile. The crucible was covered with a carbon lid and set in a carbon resistor furnace on a carbon ring as a setter. A carbon tube connected to an argon supply passed through the bottom of the furnace to the bottom of the crucible so that a stream of argon was permitted to cool the crucible.

The furnace was heated up to 2,200° C. and held for 30 minutes in an atmosphere of argon at 10 millimeters mercury. Then the furnace was back filled with argon to atmospheric pressure to the gas inlet whereby the gas stream cooled the bottom of the crucible and created a thermal gradient.

The infiltration was completed 100° C. below the temperature required by the procedure described in Examples I and II. The sample showed no warping and no detectable dimensional change. The density was 3.10 grams per cc. and the product obtained was impermeable and exhibited excellent heat shock resistance.

EXAMPLE IV

Following the procedure and using the silicon carbide powder mixture described in Example II, particulate cylindrical pellets three-fourths inch diameter by one-half inch long were prepared from the silicon carbide powder mixture. The pellets were fired at 1,900° C. in argon. No shrinkage or densification occurred, but considerable strengthening was achieved.

Three of the prefired pellets were cemented together to form a stack by a paste of the following composition:

10 cc. Sodium Silicate solution 32° Be'
10 cc. Water
55 g. Silicon Carbide − 600 mesh
1 g. Graphite Powder − 200 mesh The paste was applied to the pellets soaked by water and the stack was allowed to dry at 100° C.

The obtained solid, three-fourths inch by 1½ inches long cylinder was then infiltrated by the boron carbide-silicon carbide alloy as described in detail in Example I.

The infiltrated body was sectioned longitudinally polished and investigated metallographically. There was no indication of the joints on the as-polished section. Electrolytical etching revealed large crystals of SiC grown across the original planes of contact confirming that an integral monolithic part was obtained on infiltration of an assembly of compacts.

It will be appreciated that the invention is not limited to the specific details shown in the examples and illustrations and that various modifications may be made within the ordinary skill in the art without departing from the spirit and scope of the invention.

I claim:

1. A silicon carbide ceramic body comprising a silicon carbide matrix filled with a composition consisting essentially in weight percent of 55–70 percent of boron carbide, 30–45 percent of silicon carbide and, based on the total weight of the composition, an amount up to 10 percent by weight and at least sufficient to lower the temperature of liquid formation of said composition, of a member selected from the group consisting of silicon metal and aluminum carbide.

2. The body of claim 1, wherein said matrix comprises at least 70 percent by volume.

3. A method of making a dense silicon carbide ceramic comprising the steps of
   a. preforming a porous silicon carbide body having a density of at least 70 percent,
   b. placing a composition consisting essentially in weight percent of 55–70 of boron carbide and 30–45 percent of silicon carbide in contact with the preformed porous body,
   c. firing the body in an inert atmosphere at a sufficient temperature whereby the composition infiltrates the voids of the preformed porous body, and
   d. directionally cooling the composite body under a thermal gradient extending across the body from the point at which the infiltrating composition is placed in contact with the body to a point remote from the contact point, with the contact point being at a higher temperature than the remote point to form a dense substantially nonporous silicon carbide ceramic.

4. The method of claim 3, wherein said preformed porous silicon carbide body is prepared by pressing a particulate silicon carbide mixture.

5. The method of claim 3, wherein said preformed silicon carbide body is prepared by slip casting.

6. The method of claim 3, wherein said composition consists essentially of 70 percent by weight of boron carbide and 30 percent by weight of silicon carbide.

7. The method of claim 3, wherein said composition additionally contains up to 10 percent by weight of an additive selected from the group consisting of silicon metal and aluminum carbide.

8. The method of claim 3, wherein said inert atmosphere is argon and the infiltration is performed under a subatmospheric pressure.

9. The method of claim 3, wherein said thermal gradient is in the range of 5°–50° C. per centimeter.

* * * * *